United States Patent Office 3,366,498
Patented Jan. 30, 1968

3,366,498
CERAMIC BODIES AND PREPARATION
THEREOF
Philip S. Osborne, Los Angeles, Calif., assignor to Raymond G. Osborne Laboratories, Inc., Los Angeles, Calif., a corporation of California
No Drawing. Filed Mar. 10, 1965, Ser. No. 438,727
19 Claims. (Cl. 106—65)

ABSTRACT OF THE DISCLOSURE

Ceramic bodies such as bricks, composed essentially of normally non-plastic igneous rocks, preferably soda and lime feldspars or mixtures thereof. In order to attain adequate plasticity a proper amount of water, preferably from 5 to 25% based on the feldspar, is added. In addition, from 0.25 to 3.0 weight percent of a combustible plasticizing binder may be added to improve plasticity. These ceramic bodies have a compressive strength of at least 9,000 p.s.i. and up to 25,000 p.s.i. A method for producing such ceramic bodies by crushing igneous rock (e.g. soda or lime feldspar) to No. 4 mesh U.S. Standard Sieve, adding a sufficient amount of water to the crushed rock to attain a sufficiently plastic state so that the crushed rock can be preformed, forming the crushed rock into an article, and firing the article to sinter the particles without substantial vitrification.

---

This invention relates to novel ceramic bodies and a method for producing the same. More particularly, this invention relates to brick and other ceramic bodies composed essentially of igneous or intrusive rocks such as feldspar, granite and the like and a method for their production.

Heavy clay products such as common brick, face brick, paving brick, hollow tile, conduits, roofing tile, drain tile, sewer pipe, etc., are comprised practically entirely of clay or shale. Common brick refers to the ordinary brick most generally used for structural purposes where a special color, texture or shape is not required. It is made from low grade clays and shales, usually surface clays; the only requirements being that the clay have the proper plasticity for molding, that it will dry without excessive warping or cracking and that it will fire at a commercially feasible temperature. Face brick, used for the exteriors of structures, is required to possess excellent color, strength and resistance to weathering. It is generally made from high-grade shales and low grade fireclays. Face brick clays have the appearance of the fired ware and must vitrify sufficiently hard to maintain this appearance under a wide range of atmospheric conditions and differing climates.

The physical properties of clay, more so than its chemical properties, control its usefulness. Such physical properties include plasticity, power of suspension, texture, shrinkage, dry strength, slaking characteristics, color, firing properties, fusibility, fired strength, hardness and porosity. Plasticity, the most important of these characteristics, is that property which enables a clay to be distorted without rupture and to retain its distorted shape after the force has been removed. It makes possible the molding of clay into any shape desired, i.e., it promotes workability.

The desirable plastic property of clay is attributed by most workers to the presence therein of finely divided aggregates which impart colloidal characteristics thereto. The requirement for a highly plastic raw material for the making of brick and other ceramic bodies and the belief that such is attainable only by the use of substances comprised of inordinately fine particles in the nature of colloids have resulted in the utilization by present day workers in the art of the same raw materials, namely, clay and shale, used by their forebears centuries ago.

It has now been found that ceramic bodies, including bricks and the like, may be produced from non-plastic substances composed essentially of igneous or intrusive rocks, including feldspar, granite and the like. It has been found further that preformed and subsequently fired ceramic bodies composed of such substances exhibit superior physical characteristics, including compressive strength, absorption and modulus of rupture.

It is an object of this invention to provide and disclose preformed and subsequently fired ceramic bodies made from igneous or intrusive rocks.

It is another object of this invention to provide and disclose substitutes for heavy clay products made from feldspar, granite and the like.

It is another object of this invention to provide and disclose bricks made from substances other than clays and shales composed essentially of natural feldspars.

It is a further object of this invention to provide and disclose ceramic bodies adapted for structural uses composed essentially of normally non-plastic feldspars and having superior strength and absorption characteristics.

It is a further object of this invention to provide and disclose a practical and economic method for producing strong ceramic bodies, including bricks, which includes preforming and then firing normally non-plastic feldspars to sinter the feldspar particles without substantial vitrification of the ceramic bodies.

These and other objects and advantages will become more readily apparent from the following description in which are illustrated some exemplary embodiments of the present invention.

In general, the present invention involves the surprising discovery that preformed and subsequently fired ceramic bodies can be made from a relatively coarse particle size feldspar or other igneous or intrusive rock and that such ceramic bodies exhibit superior strength and absorption characteristics, compared with prior art ceramic bodies including common brick and face brick whose composition has been limited heretofore to clays and shales because of their inherently colloidal nature.

Feldspar is the name applied to a group of minerals closely related in crystalline form. They are essential constituents of nearly all crystalline rocks such as granite, gneiss, mica slate, etc. In composition the feldspars are alumina silicates of potassium, sodium, calcium and barium. They occur in crystals and crystalline masses which are vitreous in luster and break rather easily in two directions essentially at right angles to each other.

According to the symmetry of their crystals, the feldspars are divisible into two series, a monoclinic series and a triclinic series. The monoclinic series includes orthoclase (potash feldspar, $K_2O \cdot Al_2O_3 \cdot 6SiO_2$), celsian ($BaO \cdot Al_2O_3 \cdot 2SiO_2$) and hyalophane [baryta feldspar $(K_2,Ba)Al_2(SiO_3)_4$]. The triclinic series includes microcline (potash feldspar, $K_2O \cdot Al_2O_3 \cdot 6SiO_2$), anorthoclase [soda-potash feldspar $(Na,K)_2O_3 \cdot 6SiO_2$] and a continuing series of minerals known as the plagioclase feldspars which include albite (soda feldspar, $Na_2O \cdot Al_2O_3 \cdot 6SiO_2$), oligoclase [lime soda feldspar $(NaAlSi_3O_8 + CaAl_2Si_2O_8)$], andesine [soda-lime feldspar $(CaO,Na_2O)Al_2O_3.4SiO_2$], labradorite (lime-soda feldspar $NaAlSi_3O_8$, $CaAl_2Si_2O_8$), anorthite (lime feldspar, $CaO.Al_2O_3.2SiO_2$) and bytownite (intermediate in composition between labradorite and anorthite).

While quartz is commonly found in feldspar, it generally does not impair the desirable characteristics of the ceramic bodies. The presence of iron oxide, however, even in amounts less than one percent, may impart sufficient undesirable color to some ceramic bodies.

The use of feldspar as the sole raw material of preformed and subsequently fired ceramic bodies such as bricks has been contraindicated heretofore by its consideration as a non-plastic material and the purported necessity for a colloidal raw material in making brick. It has now been found that ceramic bodies, including bricks, may be produced from normally non-plastic feldspars and that such feldspars need not be finely ground, it being normally sufficient to crush or grind the spar, for example, to a particle size such that substantially all particles pass a No. 4 mesh U.S. Standard Sieve, or preferably through a No. 10 mesh if it is to be formed by extrusion. Adequate plasticity may be attained for working by merely adding the proper amount of water, but the plasticity may be substantially enhanced by the addition to the coarsely crushed feldspar of a combustible plasticizing binder as explained hereinafter. The utilization of feldspar also obviates the necessity for protracted pretreatment of the raw material, a procedure normally deemed necessary heretofore, as exemplified by the prolonged weathering of clay.

The feldspathic substance used in the present invention includes natural feldspars containing silica and alumina and an oxide or oxides of alkali metals and alkaline earth metals selected from the class consisting of sodium, potassium, calcium and barium. The feldspars may be characterized by the general formula $R.Al_2O_3.SiO_2$ wherein R is selected from the class consisting of $Na_2O$, $K_2O$, CaO and BaO and mixtures thereof. The feldspars used may include those of the monoclinic series, such as orthoclase, as well as those of the triclinic series, such as albite, oligoclase, labradorite, anorthite and microcline. Soda and lime feldspars as well as soda-lime and lime-soda feldspars, and mixtures thereof, are preferred.

A large deposit of anorthosite exists in Southern California. Anorthosite is a granular plutonic igneous rock composed essentially of a mixture of feldspars, usually a mixture of albite and anorthite. Anorthosite has been found to be very effective as a raw material for ceramic bodies, and particularly for brick. A typical sample of anorthosite from the above deposit has the following chemical composition:

| | Weight percent |
|---|---|
| Silica | 60.24 |
| Iron oxide | 0.26 |
| Alumina | 31.88 |
| Lime | 5.0 |
| Magnesia | Trace |
| Soda and potash (as $Na_2O$) | 1.5 |
| Loss on ignition | 1.0 |

The method of the present invention will be described in connection with the production of brick but may be applied to other ceramic bodies. It involves crushing or grinding the raw material composed essentially of feldspars to a particle size such that essentially all particles pass through a No. 4 mesh U.S. Standard Sieve. If the particles are to be subsequently extruded, it is preferred that the particle size be no greater than No. 10 mesh. Grinding or crushing may be done on conventional equipment on gyratory crushers, jaw crushers or roll crushers. The particle size distribution should be such that the percent voids in the finished bodies is a minimum.

Following the crushing step, the feldspar is put into a sufficiently plastic state so that it can be formed, preferably by extrusion or molding techniques. It has been found that suitable plasticity may be obtained by the addition of a proper amount of water, preferably ranging from about 5 to 25 weight percent of the feldspar. When extrusion is to be used for forming, the amount of added water preferably ranges from about 7 to about 20 weight percent, whereas if molding is to be performed, for example, by the dry-press method, the amount of added water preferably ranges from about 5 to about 10 weight percent.

It has been found, moreover, that substantial improvement in plasticity may be obtained by addition to the feldspar and water of a combustible plasticizing binder in an amount preferably ranging from about 0.25 to about 3.0 weight percent, based on the feldspar. The plasticizing binder may be any substance which is capable of imparting plasticity to the feldspar. Its presence as a constituent is temporary since it is decomposed during the subsequent firing step. Organic plasticizing binders have been found most suitable. Examples of plasticizing binders include cornstarch, glue, gum arabic, gluten and "wheat short," a by-product of milling. Particularly good results have been obtained with "Cereamic," a starch produced as a by-product in corn oil extraction plants, sold by General Mills Company of Minneapolis, Minnesota, and with Mogul gum, a by-product of the waste liquor of the sulfite pulping process.

The crushed feldspar, water and plasticizing binder are mixed until the desired plasticity is obtained. The mixing may be satisfactorily accomplished in a pug mill or other suitable mixing apparatus. The mass is then subjected to a molding or forming operation, preferably by an extrusion or dry-press technique. A standard brick extruder may be used, such as the screw type Bonnot extruder in which the mass is forced through perforated plates into a vacuum chamber and carried into an extrusion die. Alternatively, the mass may be molded, for example, by a dry-press brick machine. Other molding processes normally used in forming brick may also be used.

The molded bricks are preferably dried in air at somewhat elevated temperatures, for example, at about 140° F., until their weight remains substantially constant, although satisfactory drying may be accomplished at ambient temperatures and up to about 180° F. or higher.

The "green" bricks are then subjected to a firing operation whereby the particles of crushed feldspar become sintered to each other but the fired object becomes only partially vitrified. Firing may be performed preferably by a continuous type operation in a tunnel kiln although a shuttle kiln or other suitable kiln may be used. Firing may be accomplished in reducing, oxidizing or neutral atmospheres, the colors varying from white to light brown in oxidizing atmospheres and brown gray to dark brown in reducing atmospheres. The firing temperatures, which affect the color, strength and moisture absorption, may range from about 1900° F. to 2400° F. Potash feldspars are preferably fired at about 1900° F.–2100° F., soda feldspars at about 2100° F.–2200° F. and lime feldspars at about 2200° F.–2400° F. Generally, relatively higher firing temperatures and longer firing periods result in products of higher density having greater strength and reduced porosity and absorption characteristics. Excellent strength and absorption characteristics have been obtained at firing temperatures of about 2200° F. to 2350° F. Typically, the kiln is brought up to the desired firing temperature in about eight hours, the bricks are soaked at such temperature for four to five hours, and cooled slowly for four to five hours to allow for proper annealing in order to prevent the development of strains.

The following examples are illustrative of the present invention and are not intended to be limitative with respect thereto:

EXAMPLE I

Feldspar from an anorthosite deposit in Los Angeles County, California, having the chemical composition set forth above was ground through jaw crushers and rolls. A sample had the following sieve analysis:

| U.S. Standard Sieve | Percent weight on sieve |
|---|---|
| 3 | Trace |
| 4 | 0.2 |
| 6 | 3.6 |
| 12 | 27.2 |
| 20 | 16.8 |
| 30 | 7.9 |
| 40 | 6.9 |
| 50 | 5.6 |
| 70 | 8.2 |
| 100 | 5.2 |
| 140 | 4.5 |
| 200 | 2.7 |
| 270 | 1.1 |
| Pan | 9.7 |

The feldspar was mixed with 17.3% water and 0.5% Mogul gum until sufficiently plastic and put through a Bonnot extruder. The resultant bars were air dried for 15 hours at 70° F. and at a relative humidity of about 10% to 15%. The bars were then placed in a drier at a temperature of 100° F. for four hours. No cracking of the bars was evidenced after 21 hours.

EXAMPLE II

Five samples of green feldspar bricks were prepared in a manner similar to that shown in Example I except that forming was done in a dry press brick operation. The bricks were fired in a shuttle kiln under varying conditions and tested according to procedures outlined in A.S.T.M. Designation C-67-60 (Tentative Revision Nov. 6, 1959) and Specification No. C.216-60. The kiln was brought to the desired temperature in about eight hours and the bricks soaked for four hours and cooled for four hours. The following results were obtained:

|  | Sample No. | | | | |
|---|---|---|---|---|---|
|  | 1 | 2 | 3 | 4 | 5 |
| Absorption Tests: | | | | | |
| 24-hr. Cold water, percent | 0.66 | 4.33 | 5.33 | 1.00 | 1.00 |
| 5-hr. Boil, percent | 0.66 | 10.33 | 11.00 | 3.01 | 3.01 |
| Saturation Coefficient | 1.00 | 0.419 | 0.485 | 0.33 | 0.332 |
| Modulus of Rupture, p.s.i. | 2,018 | 1,441 | 1,077 | 1,849 | 1,905 |
| Compressive Strength, Dimensions: | | | | | |
| Length | 4.17 | 4.36 | 4.38 | 4.26 | 4.24 |
| Width | 3.32 | 4.08 | 4.06 | 4.08 | 3.82 |
| Depth | 2.2 | 2.15 | 2.2 | 2.15 | 2.10 |
| Gross Area, sq. in | 13.84 | 17.79 | 17.78 | 17.38 | 16.20 |
| Ultimate Load, lbs | 325,000 | 221,500 | 169,000 | 277,000 | 296,000 |
| Lbs. per sq. in | 23,483 | 12,451 | 9,505 | 15,938 | 18,271 |
| Mortar Shear Strength (p.s.i.) | 96 | 224 | 224 | 54 | 69 |
| Warpage (maximum departure from flat in length) | (¹) | (²) | (³) | (²) | (³) |

¹ Convex Avg. 1/16″.
² No Warpage.
³ Concave Avg. 1/32″.

No. 1—8.70″ x 4.15″ x 2.2″, Spar straight; fired 2,380° F.

No. 2—8.70″ x 4.35″ x 2.15″, Spar straight; fired 2,250° F.

No. 3—8.80″ x 4.40″ x 2.20″, Spar ½% Chromium oxide; fired 2,250° F.

No. 4—8.60″ x 4.25″ x 2.15″, Spar straight; fired 2,300° F.

No. 5—8.60″ x 4.25″ x 2.10″, Spar straight; fired 2,300° F.

The present invention provides bricks having a compressive strength of at least 9,000 p.s.i., generally in excess of 9,000 p.s.i. and ranging up to 25,000 p.s.i., a modulus of rupture of at least 1,000 p.s.i., generally in excess of 1,000 p.s.i. and ranging up to 2,500 p.s.i., and a water absorption which may be controlled to preferably range from about 4% to 18% depending upon the firing cycle, particle size distribution and moisture content. The finished bricks maintain their physical integrity when subjected to extremely severe conditions, for example, they may withstand temperatures of up to 1800° F. to 2000° F. without appreciable change in their physical properties. Bricks made from clay and shale generally have a compressive strength of less than 6,000 p.s.i. and a modulus of rupture of less than 1,000 p.s.i.

It will be apparent that the present invention provides novel ceramic bodies made from materials other than clay or shale and composed essentially of feldspar or other igneous rock, which exhibit superior physical characteristics, including compressive strength, modulus of rupture and water absorption. While the ceramic bodies may also contain very small amounts of impurities normally associated with natural feldspar deposits, they may be characterized as composed essentially, i.e., consisting almost entirely, of natural feldspars since such impurities, if present, are included in such small amounts, normally less than about one or two percent, as to have no discernible effect on the desirable characteristics of the finished bodies.

The present invention also provides a method which includes the steps of first preforming and subsequently firing the ceramic bodies whereby only partial vitrification of the ceramic bodies is effected while the individual particles of feldspathic material are sintered to each other.

It is apparent also that various modifications may be made to the instant invention without departing from the spirit thereof and therefore this invention is limited only as indicated in the appended claims.

I claim:

1. A preformed and subsequently fired ceramic body composed essentially of particles of crushed feldspar rocks containing silica and alumina and an oxide of alkali metals and alkaline earth metals selected from the group consisting of sodium, potassium, calcium, barium and mixtures thereof and having a compressive strength in excess of 9,000 p.s.i. and ranging up to 25,000 p.s.i. and an absorption ranging from about 4% to about 18%.

2. A ceramic body according to claim 1 wherein the feldspar rock is anorthosite.

3. A preformed and subsequently fired brick composed essentially of particles of crushed feldspars having the general formula $R.Al_2O_3.SiO_2$ wherein R is selected from the group consisting of $Na_2O$, CaO, BaO and mixtures thereof, said fired brick being only partially vitrified and having a compressive strength in excess of 9,000 p.s.i. and ranging up to about 25,000 p.s.i., a modulus of rupture up to about 2,500 p.s.i. and an absorption ranging from about 4% to about 18%.

4. A preformed and subsequently fired brick substantially devoid of clay and shale and composed essentially of particles of crushed feldspars sintered to each other comprising silica and alumina and an oxide of alkali metals and alkaline earth metals selected from the class consisting of sodium, calcium, barium and mixtures thereof, said fired brick being only partially vitrified and having a compressive strength of at least 9,000 p.s.i.

5. A preformed and subsequently fired ceramic object composed essentially of particles of crushed feldspar having the formula $R.Al_2O_3.SiO_2$ wherein R is selected from the group consisting of $Na_2O$, CaO, BaO and mixtures thereof, said particles being sintered to each other, said fired object being only partially vitrified and having the ability to absorb between 4% and 18% of water when in dry condition, the fired object having a compressive strength of over 9000 lbs. p.s.i. and the ability to withstand temperatures of 1800° F. to 2000° F. without appreciable change in its physical properties.

6. A method of producing strong ceramic objects adapted for structural uses, composed essentially of particles of normally non-plastic feldspars comprising crushing naturally occurring feldspars having the general formula $R.Al_2O_3.SiO_2$ wherein R is selected from the group consisting of $Na_2O$, CaO, BaO and mixtures thereof to pass a 4-mesh sieve, moistening the crushed material with between 7% and 20% of water by weight, pressure-forming the moistened material into objects of desired size, drying and then firing the formed objects to a temperature of between 2000° F. and 2300° F. for a time sufficient to sinter the particles together but without vitrification of the body of the object to produce a fired object having an absorption of between 4% and 18% and a crushing strength of between 9,000 and 25,000 p.s.i.

7. A method according to claim 6 including the step of adding a combustible organic plasticizing binder to the water prior to pressure-forming.

8. A process for producing a ceramic body composed essentially of particles of normally non-plastic feldspars which comprises:
crushing naturally occurring feldspars having the general formula $R.Al_2O_3.SiO_2$ wherein R is selected from the group consisting of $Na_2O$, CaO, BaO and mixtures thereof,
mixing the feldspar with about 5 to 20 weight percent water until the mixture becomes sufficiently plastic,
forming the plasticized feldspar into a predetermined shape,
drying the formed body to a substantially constant weight and then
firing the formed body at a temperature ranging from about 1900° F. to about 2400° F. for a time sufficient to sinter the particles together but without substantially vitrifying the ceramic body to produce a fired body having an absorption between 4 and 18% and a compressive strength between 9,000 and 25,000 p.s.i.

9. A process according to claim 8 wherein the feldspar is ground to pass a 4-mesh sieve.

10. A process according to claim 8 wherein the feldspar is ground to pass a 10-mesh sieve.

11. A process for producing bricks composed essentially of particles of normally non-plastic feldspar which comprises:
crushing naturally occurring feldspars having the general formula $R.Al_2O_3.SiO_2$ wherein R is selected from the group consisting of $Na_2O$, CaO, BaO and mixtures thereof,
mixing the feldspar with about 5 to 25 weight percent of water and about 0.25 to 3.0 weight percent of a plasticizing binder until the mixture becomes sufficiently plastic,
forming the plasticized feldspar into a predetermined brick shape,
drying the formed brick to a substantially constant weight, and then
firing the brick at a temperature ranging from about 2000° F. to 2300° F. for a time sufficient to sinter the particles together but without substantially vitrifying the ceramic body to produce a fired body having an absorption between 4 and 18% and a compressive strength between 9,000 and 25,000 p.s.i.

12. A process according to claim 11 wherein the forming is done by extrusion.

13. A process according to claim 11 wherein the forming is done by molding.

14. A process according to claim 11 wherein the plasticizing binder is a combustible organic binder.

15. A process according to claim 11 wherein the feldspar is crushed to pass a 4-mesh sieve.

16. A process according to claim 11 wherein the firing step is performed at about 2200° F. to 2300° F.

17. A process according to claim 12 wherein the amount of added water ranges from about 7 to about 15 weight percent.

18. A process according to claim 13 wherein the amount of water ranges from about 5 to about 10 weight percent.

19. A process according to claim 14 wherein the amount of binder is about 0.5 weight percent.

References Cited

UNITED STATES PATENTS 3,199,992   8/1965   Moffitt _____ 264—44

OTHER REFERENCES

Kirkendale, A Textbook For Ceramic Engineers, Alfred Univ., Alfred, N.Y., 1954, p. 11.

ROBERT F. WHITE, *Primary Examiner.*

J. A. FINLAYSON, *Assistant Examiner.*